Nov. 20, 1962
J. E. BIRD
3,065,354
LIQUID LEVEL SENSOR
Filed May 1, 1959
2 Sheets-Sheet 1
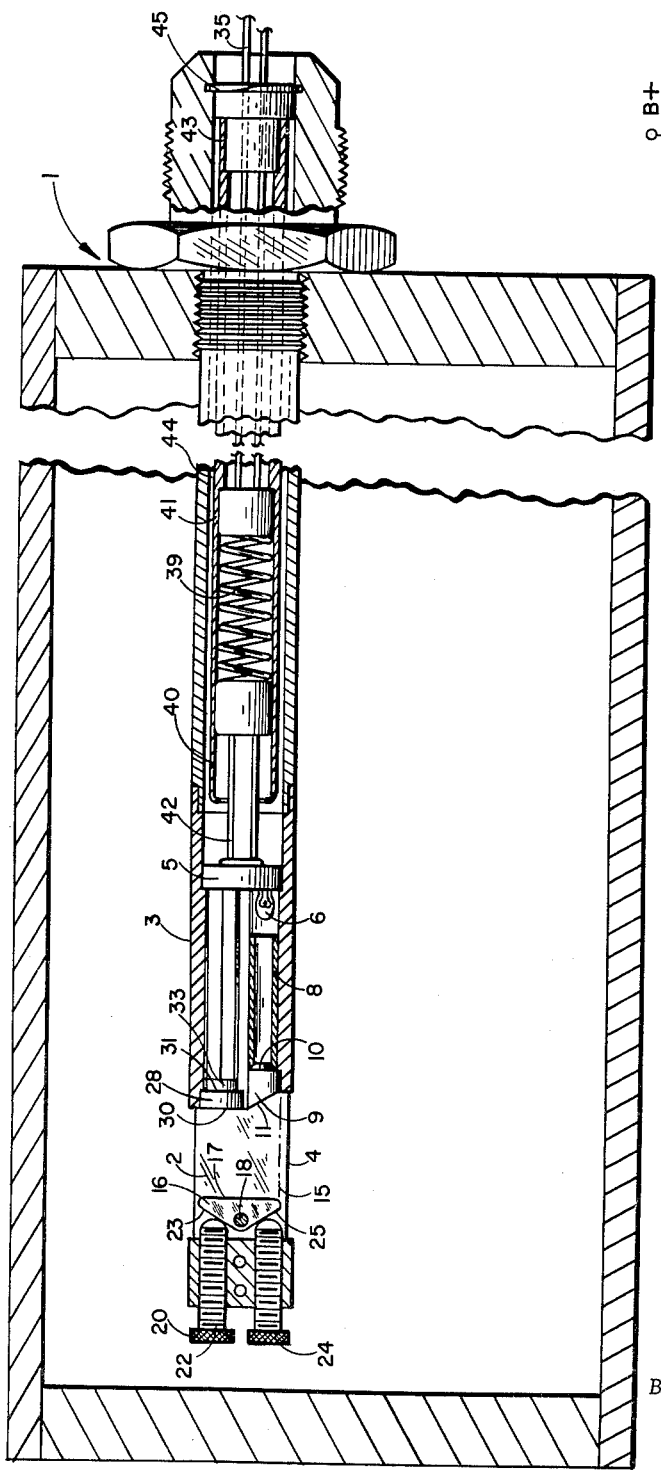
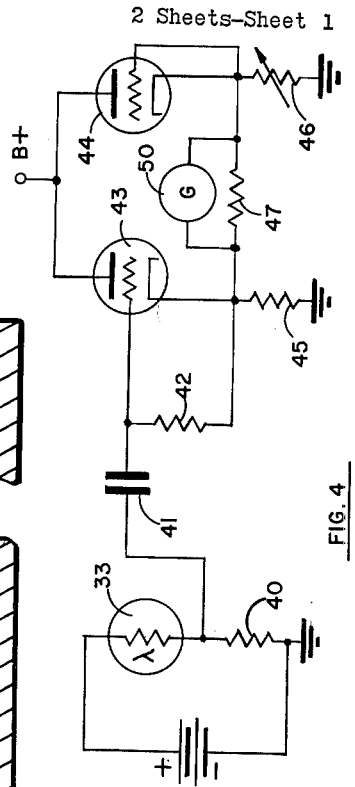
INVENTOR.
JOSEPH E. BIRD
BY John A. Duffy
AGENT

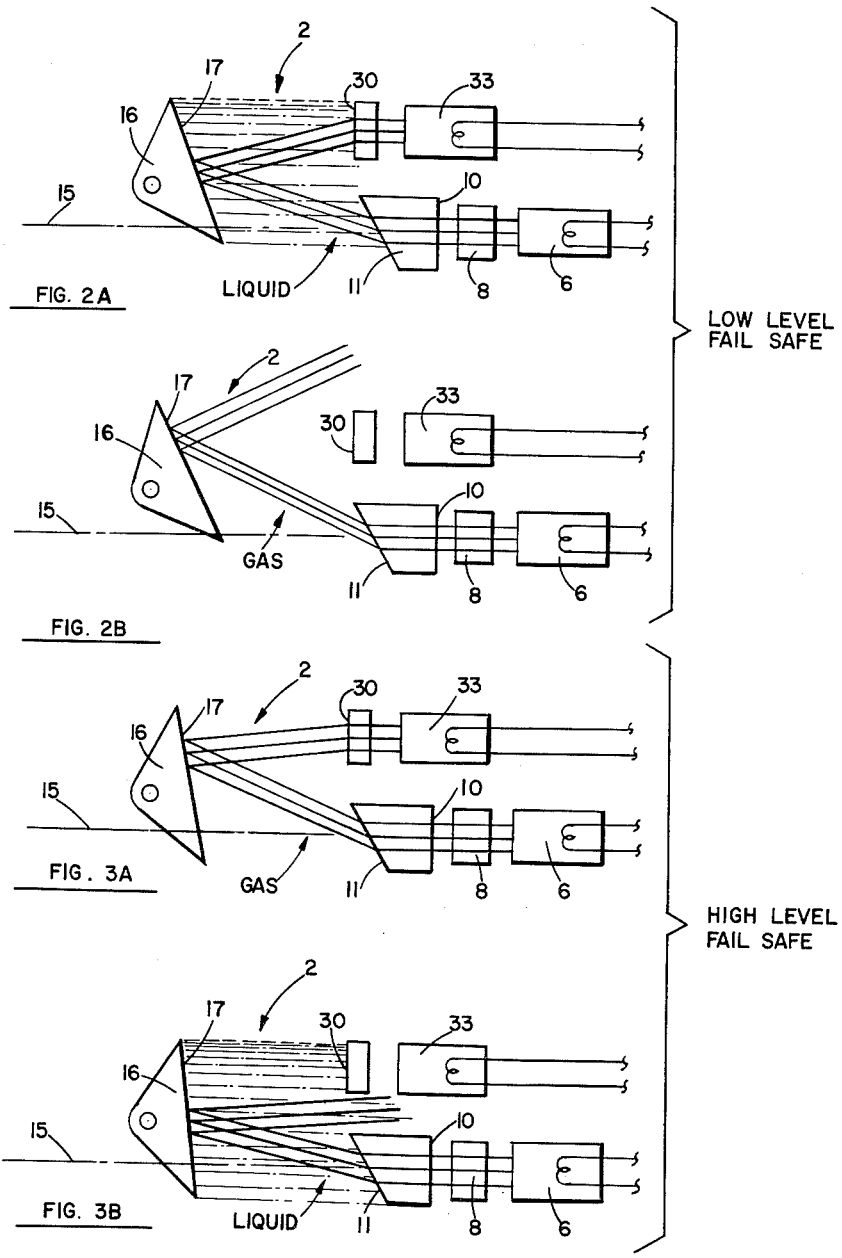

United States Patent Office 3,065,354
Patented Nov. 20, 1962

3,065,354
LIQUID LEVEL SENSOR
Joseph E. Bird, Woodland Hills, Calif., assignor to
North American Aviation, Inc.
Filed May 1, 1959, Ser. No. 810,427
16 Claims. (Cl. 250—218)

This invention relates to a liquid level sensing device and more particularly to a light-sensitive device for sensing the level of liquid in a chamber.

Light-sensitive devices for measuring the level of a liquid in a tank or chamber are well known. According to basic principles well known in the art, light is directed into a light-transmitting substance such as glass or plastic, one end of which is the liquid level sensing point. When a particular beam of light reaches this sensing level it will either be reflected or transmitted through the surrounding medium depending on whether the beam of light is incident at an angle greater or less than the critical angle of incidence. For a typical effect of the beam of light the light will be reflected when the light-sensitive device is surrounded by gas and transmitted when surrounded by liquid. Light-sensitive means, such as a photoconductive cell placed near the light source, will receive the reflected light and cause an electrical signal to be produced at the instant the liquid reaches the predetermined sensing level. The signal thus produced when coupled with appropriate electronic measuring circuitry can be recorded or used for control, thereby accurately sensing and controlling the level of liquid.

Light-sensitive liquid level sensors previously produced have several disadvantages. For example, the large physical size and complexity of construction in present-day light-sensitive liquid level sensors have intensified the search for a better optical liquid level sensor. In addition, present-day optical liquid level sensors evidence a small signal output and a low signal-to-noise ratio when subjected to vibration. Thus an accurate electrical output indicating the liquid level is difficult to obtain. The low factors of reliability, reproducibility, and lack of fail-safe provisions add to the disadvantages of present-day optical liquid level sensors.

The device of this invention provides a light-sensitive liquid level sensor which overcomes the disadvantages of previous liquid level sensing devices.

According to the device of this invention a simple and small optical liquid level sensor is provided which provides a strong signal and a high signal-to-noise ratio signal upon occurrence of a liquid level at the predetermined signal sensitive level. Utilizing a minimum of reliable and durable components arranged in a compact manner an optical liquid level sensor is provided which exhibits a marked improvement over known liquid level sensors.

It is therefore an object of this invention to provide an improved liquid level sensor.

It is another object of this invention to provide a liquid level sensor adaptable to a plurality of liquids.

It is still another object of this invention to provide an optical liquid level sensor with a high signal-to-noise ratio.

It is a further object of this invention to provide a liquid level sensor wherein the source of light and the light-sensitive measuring device are in a parallel path.

It is another object of this invention to provide means for measuring the liquid level in a chamber utilizing adjustable means whereby a plurality of liquids may be measured.

It is still another object of this invention to provide a liquid level sensor adaptable for liquids with different indices of refraction.

It is a further object of this invention to provide a liquid level sensor with fail-safe features for both low liquid level and high liquid level cutoffs.

Other objects of this invention will become apparent from the following description taken in connection with the accompanying drawings in which:

FIG. 1 is a sectional view of the preferred embodiment of the invention.

FIG. 2 is a schematic diagram illustrating the operation of the liquid level sensor when used as a low level indicator. FIG. 2a illustrates the operation when the liquid level is above the sensing level and FIG. 2b illustrates the operation when the liquid level falls below the sensing level.

FIG. 3 is a schematic diagram illustrating the operation of the liquid level indicator when used as a high level indicator with FIG. 3a illustrating the light path when the liquid level is below the sensing level and FIG. 3b illustrating the light path when the level rises above the sensing level.

FIG. 4 is a schematic diagram illustrating a typical electrical measuring means.

Referring to FIG. 1, the preferred embodiment of the invention, there is shown the liquid level sensor of the invention suitably mounted in tank 1 which contains the liquid whose level is to be measured. A liquid chamber 2, which is part of cylindrical housing assembly 3 of the liquid level sensor, has lower side 4 open to receive the liquid from tank 1. Disposed within housing assembly 3 and suitably secured to chassis assembly 5 is a light source 6 arranged to direct light through collimator means 8. Collimator means 8 in the preferred embodiment in FIG. 1 is an internally threaded metallic tube having one end extending over light source 6. Thus a beam of light from light source 6 is collimated and emerges longitudinally from tube 8. Alternatively, collimator means 8 may comprise a spherical ball or a shaped lens suitably interposed between prism 9 and light source 6, as heretofore used in collimators. Prism 9 having face 10 located at the end of collimator 8 receives the beam of light therefrom at face 11. Prism 9 is shown as having a section in the form of a right triangle with face 11 the hypotenuse. Face 11 is suitably disposed within chamber 2, and face 10 opposite hypotenuse 11 is connected to receive the beam of light from collimator 8. Prism 9 may be formed of transparent material such as synthetic sapphire, glass, or other suitable transparent material. The beam of light is refracted from face 11 through chamber 2. The angle of refraction depends on the particular angle of incidence of the collimated light beam, the indices of refraction of prism 9, and the medium present in chamber 2. In all cases the angle of incidence at face 11 is less than the critical angle of the material from which prism 9 is fabricated, allowing total refraction of light from face 11 regardless of what type of medium is present in chamber 2. Disposed at the other end of chamber 2 to receive the beam of light refracted from face 11 is reflecting means 16 which may consist, for example, of a mirror having a face 17 suitably disposed and arranged with reference to face 11 to receive the beam of light transmitted through chamber 2 and reflect it therefrom. Reflecting means 16 may consist, for example, of a triangularly shaped steel structure having a finely polished mirror face 17 adjacent chamber 2 and faces 23 and 25 forming the other two sides of the triangle. Reflecting means 16 pivots about pivot point 18 suitably secured to housing assembly 3. The angle of mirror face 17 with respect to face 11 of prism 9 may be adjusted by adjustable means 20 which may consist, for example, of a pair of screws 22 and 24, with screw 22 being adapted to push against face 23 of mirror 16 thereby adjusting the angle of face 17 in one direction and screw 24 being adapted to push against face 25 adjusting the mirror in the opposite direction. In this manner the angle of incidence of the beam of light from face 11 of prism 9 as it strikes face 17 may be adjusted in accordance with the index of refraction of the liquid in chamber 2 to obtain the desired operation to be described below. Window 28 has a face 30 disposed in chamber 2 to receive the light beam reflected from face 17 of mirror 16. Window 28 may be constructed of material such as synthetic sapphire, glass, or other suitable transparent material. Face 30 of window 28 receives a beam of light from face 17 and transmits the beam of light from face 31 which is opposite and parallel to face 30. Light sensitive means 33, suitably secured to chassis assembly 5, receives the light from face 31 of window 28. The beam of light as it leaves face 31 is in parallel with the beam of light passing through collimator 8 to face 10 of prism 9 by reason of the fact that face 10 of prism 9 and face 31 of window 28 are parallel. Thus the light entering face 10 from collimator 8 is adjusted to be perpendicular to face 10, and the light transmitted from face 31 of window 28 is perpendicular to face 31 due to the optical properties of window 28. Because the beam of light passing through collimator 8 is in parallel with the beam of light transmitted from window 28 the structure is more simple and compact. In order to prevent undesired light from leaking from prism 9, face 11 is disposed in relation to face 30 so that no portion of face 11 extends farther into chamber 2 than face 30. Light sensitive means 33 which may be, for example, a photoconductive cell which transmits electricity proportional to the amount of light energy received, is supplied with operating electric current through suitable electrical conductors 35.

In order to provide an adequate protection for the liquid level sensor a vacuum tight bonded pressure seal is provided by fitting prism 9 and window 28 within housing assembly 3 to provide a pressure tight fit. For example, a vacuum tight fit between assembly 1 and the outer portions of prism 9 and window 28 is provided by using suitable bonding ceramic material first painted on assembly 3 and then placing prism 9 and window 28 therein. In this manner the remainder of the material in housing assembly 3 such as that secured to chassis assembly 5 is thus protected from any leakage of liquid or gas from chamber 2. Chassis assembly 5, which holds light source 6 and light sensitive means 33, is held in place by spring 39 which is suitably secured at opposite ends to holders 40 and 41. Holder 40 is attached to the base of assembly 5 by bar 42. Holder 41, along with end 43, is rigidly enclosed in internal assembly 44 which fits in housing assembly 3. Retainer ring 45 holds assembly 44 and assembly 5 in assembly 3 with spring 39 in compression. Assembly 5 and assembly 44 may be removed for inspection or repair by disengaging retainer ring 45. Thus it is seen that the complete electrical part of the system, including light source 6, light-sensitive means 33 and associated wiring, may be removed for inspection or repair without removing the housing assembly 3 from tank 1. Repairs or inspection may thereby be made without disturbing liquid in tank 1.

The liquid level sensor of FIG. 1 can be used as a high level fail-safe indicator or a low level fail-safe indicator simply by adjusting mirror 16. In FIG. 2 there is shown a pair of schematic diagrams illustrating the operation of the liquid level sensor of FIG. 1 when used as a low level fail-safe indicator. In FIG. 2a liquid is indicated as being above the chamber's sensing level 15. Light from source 6 passes through collimator 8 and the resultant beam of light is transmitted through prism 9, passing from face 10 to face 11. Light is refracted from face 11 and transmitted through the liquid in chamber 2 at an angle of refraction determined by the liquid in the chamber. Adjustable means 16 is adjusted so that the angle of incidence of light striking face 17 is such that the light reflected from face 17 strikes face 30 of window 28. Photosensitive means 33 receives the light from face 31 emitting a signal at its output. Thus there is a positive signal from means 33 indicating that liquid is present in tank 1 (of FIG. 1) above the sensing level 15.

In FIG. 2b, the liquid in tank 1 (FIG. 1) has fallen below sensing level 15 (in chamber 2). Light originating from light source 6 is refracted from face 11 of prism 9 at an angle different than that in FIG. 2a since there is now air in chamber 2 opposite face 11 rather than the liquid in FIG. 2a. Thus light is refracted from face 11 at a new angle and strikes face 17 of mirror 16 at an angle of incidence so that the reflected light from face 17 does not strike face 30. Photosensitive means 33, detecting no light, no longer produces an output signal. Or, as otherwise stated, when the liquid in tank 1 falls below sensing level 15 in chamber 2 (FIG. 2b), photosensitive means 33 presents a high resistance to the flow of current, whereas when the liquid was still at sensing level 15 (FIG. 2a), photosensitive means 33 presented a low resistance to the flow of current. It is thus seen from the illustration of FIGS. 2a and 2b that the device operates as a fail-safe low level indicator with the electrical resistance of photosensitive means 33 changing from low to high as the liquid falls below level 15.

In FIG. 3 there is illustrated the operation of the device acting as a fail-safe high level indicator. The operation is similar to that described for FIG. 2. However, in FIG. 3 means 16 is adjusted so that light is received by photosensitive means 33 (FIG. 3a) when air is present in chamber 2. When the liquid in tank 1 rises to sensing level 15 (as shown in FIG. 3b) light is reflected by face 17 so as to substantially miss face 30 of window 28. Photosensitive means 33 indicates that level 15 has been reached by increasing in its resistance to the flow of current when no light is being received.

The liquid level sensing device of this invention functions either as a low level indicator (FIG. 2) or a high level indicator (FIG. 3) depending solely on the adjustment of mirror 16. No other adjustment of any of the parts of the device is necessary. Additionally, the device may also be made adaptable to variety of liquids or gases, again utilizing the adjusting means (illustrated in FIG. 1) to produce the proper angle of incidence at which light is received by mirror face 17.

An important function of the liquid level device of FIG. 1 is the fail-safe feature inherent in its operation either as a high level fail-safe indicator or as a low level fail-safe indicator. Thus in FIG. 3, for example, where the device is operating as a high level fail-safe indicator, initially when the liquid level is below line 15, photosensitive means 33, presenting a low resistance to the flow of current, can be said to be emitting a current signal indicative of no liquid at level 15. Now, assuming the occurrence of a structural or electrical failure in the device before the liquid reaches level 15, an open circuit is produced and means 33 will cease to emit a current signal, thereby indicating (falsely) that liquid has reached level 15. This indication is known as a fail-safe indication since circuitry (to be described later) in the associated system acting on this false indication would stop the filling of tank 1 as if liquid had actually reached level 15. Thus tank 1 is not allowed to fill past level 15 even upon a functional failure of the liquid level sensor.

Similarly, in FIG. 2 for example, a low level indication will be given by photosensitive means 33 upon a functional failure even before the liquid has fallen below level 15.

Turning now to FIG. 4, there is shown a schematic diagram illustrating one manner of measuring the output from the liquid level sensor. In FIG. 4 light-sensitive means 33 is represented electrically as a resistor 40. The resistance of 40 varies in response to the amount of light energy received from light source 6 according to well known principles of photoconductive devices. When light-sensitive means 33 is connected in the circuit as shown in FIG. 4, a change in resistance of variable resistor 40 such as, for example, an increase when liquid has reached sensing level 15 in FIG. 3b, is coupled through capacitor 41 and resistor 42 which differentiate the signal and apply its output to the grid of triode 43. Triodes 43 and 44 receive operating potentials by having their plates connected in common to a B+ source and their cathodes connected in common through resistor 45 and variable resistor 46 to a B— source. Initially, variable resistor 46 is adjusted so that no difference in potential existed between the cathode of 43 and the cathode of 44. As the output of capacitor 41 and resistor 42 changes, the voltage on the grid of triode 43 changes correspondingly which in turn causes a change in current flowing through the plate cathode circuit of triode 43 and cathode resistor 45. This change causes a momentary change in the potential between the cathodes of triodes 44 and 43 which appears across resistor 47. A suitable measuring device 50, such as a galvanometer 50 or recording oscillograph, measures this change of voltage, thereby indicating the change in resistance across resistor 40 which is equivalent to the light energy received by light-sensitive means 33. Other means of measuring the output of light-sensitive means 33 such as, for example, a magnetic amplifier having a D.-C. control source connected to receive the change in signal from resistance 40, are readily apparent.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for measuring the level of a liquid in a chamber comprising a light source, prism means disposed within said chamber, said prism means being responsive to said light source to direct light through said chamber, reflector means disposed within said chamber in a predetermined angular relationship with said prism means for directly reflecting said directed light, light-sensitive means directly responsive to the light reflected by said reflector means for indicating said light, and means for varying said predetermined angular relationship in accordance with the index of refraction of said liquid.

2. Means for measuring the level of a liquid comprising a chamber disposed to receive liquid, a source of light, means responsive to said source for providing a first path for said light, prism means disposed within said chamber and responsive to said light in said first path to create a second path for said light through said chamber, means forming a single light reflecting surface in juxtarelated relationship with respect to said prism means and being directly responsive to the light directed through said chamber in said second path for reflecting said light to create a third path, means directly responsive to the light in said third path for providing a fourth path for said light, and light-sensitive means responsive to said light in said fourth path for measuring said light.

3. The combination recited in claim 2 wherein said fourth light path is in parallel relationship with respect to said first light path.

4. A liquid level indicator for indicating the level of a liquid in a chamber comprising a source of light, collimator means responsive to said source for providing a first path for said light when said liquid is at a predetermined level, first refraction means disposed in said chamber and responsive to said light in said first path for refracting said light through said chamber in a second path, reflecting means disposed in said chamber forming a single light reflecting surface in juxtarelated relationship with respect to said first refraction means and directly responsive to the light in said second path for directly reflecting light in a third path, second refraction means responsive to the light in said third path for providing a fourth path for said light, and light-sensitive means responsive to the light in said fourth path for providing an indication of the level of said liquid.

5. The combination recited in claim 4 wherein said first path is in parallel relationship with respect to said fourth path.

6. The combination recited in claim 4 wherein is included means for adjusting said reflecting means relative to said first refraction means in accordance with said liquid in said chamber.

7. Means for indicating the level of a liquid comprising an elongated housing, a chamber disposed in said housing and adapted to be communicative with said liquid, a source of light, collimator means responsive to said source for directing a beam of light longitudinally along a first path of predetermined level which is in substantial parallel relationship with respect to the level of said liquid, first refraction means having a predetermined index of refraction, said first refraction means disposed in said chamber and responsive to said beam of light for directing said beam through said chamber, reflecting means disposed in said chamber and having a reflecting surface at a predetermined angular relationship with said first path, said reflecting means directly responsive to the light from said first refraction means for reflecting light, second refraction means directly responsive to the light from said reflecting means when said liquid is at said predetermined level for directing said light longitudinally along a second path, and light-sensitive means responsive to said light in said second path for indicating the level of said liquid.

8. The combination recited in claim 7 wherein is included means for adjusting said reflecting means whereby the predetermined angular relationship of the reflecting surface of said reflecting means with said first path varies in accordance with the index of refraction of said liquid.

9. A liquid level indicator comprising an elongated housing, a chamber disposed in said housing for receiving said liquid, a source of light, a collimator responsive to said source for directing a beam of light longitudinally along a first path of predetermined level, a prism, said prism having three faces connected to form a right triangle having two sides and a hypotenuse, one of said sides being responsive to said beam of light in said first path, said hypotenuse being disposed in said chamber whereby said beam of light passes through said prism and said chamber, a mirror having a reflecting face disposed in said chamber opposite said hypotenuse for receiving said beam of light passing through said chamber and reflecting said beam at a predetermined angle therefrom, a window having a pair of parallel faces, one of said faces disposed in said chamber to receive said beam of light reflected by said mirror, the other said face disposed to direct said beam of light longitudinally along a second path, and a photocell responsive to said beam of light in said second path for measuring said light.

10. The combination recited in claim 9 wherein said second path is parallel with said first path.

11. The combination recited in claim 9 wherein is included a pair of adjusting screws disposed against a non-reflecting face of said mirror for moving the reflecting face of said mirror relative to said hypotenuse of said prism.

12. The combination recited in claim 9 wherein said mirror has a pair of non-reflecting faces, said reflecting face and said non-reflecting face forming three sides of a triangle, and wherein is included a pair of adjusting screws, one of said screws disposed against one of said non-reflecting faces and the other of said screws disposed against the other of said non-reflecting face, for moving the reflecting face of said mirror relative to the hypotenuse of said prism.

13. The combination recited in claim 9 wherein said collimator comprises a metallic tube longitudinally disposed along said first path.

14. The combination recited in claim 9 wherein the side of said prism responsive to the light in said first path forms a face parallel to the other face of said window.

15. A combination comprising a chamber, said chamber containing a liquid therein forming a substantially level surface, means constructed and arranged in said chamber for determining the position of said surface, said means comprising a first means for emitting a beam of light in a first direction which is in substantial parallel relationship with respect to said surface, second means constructed and arranged adjacent to said first means for receiving and redirecting said light beam in a second direction which is away from said surface, third means constructed and arranged adjacent to and facing said second means for receiving and redirecting said light beam in a third direction and fourth means for indicating said light whereby said liquid level can be determined in accordance with the index of refraction of said liquid.

16. The invention of claim 15 further comprising adjustment means operatively connected to said third means for selectively orientating said third means relative to said second means.

References Cited in the file of this patent

UNITED STATES PATENTS

| | | |
|---|---|---|
| 1,828,894 | Freygang | Oct. 27, 1931 |
| 2,256,595 | Metcalf | Sept. 23, 1941 |
| 2,580,500 | Albert | Jan. 1, 1952 |
| 2,727,997 | Schofield | Dec. 20, 1955 |
| 2,827,824 | Reinecke | Mar. 25, 1958 |
| 2,892,378 | Canada | June 30, 1959 |
| 2,943,530 | Nagel | July 5, 1960 |

FOREIGN PATENTS

| | | |
|---|---|---|
| 618,167 | Germany | Sept. 3, 1935 |